(12) United States Patent
Rundle et al.

(10) Patent No.: US 9,507,528 B2
(45) Date of Patent: Nov. 29, 2016

(54) CLIENT-SIDE DATA CACHING

(71) Applicants: Robert Rundle, Albuquerque, NM (US); Nicolaas Pleun Bax, Zuid Holland (NL); Michelangelo Partipilo, The Hague (NL)

(72) Inventors: Robert Rundle, Albuquerque, NM (US); Nicolaas Pleun Bax, Zuid Holland (NL); Michelangelo Partipilo, The Hague (NL)

(73) Assignee: BAKER HUGHES INCORPORATED, Houston, TX (US)

(*) Notice: Subject to any disclaimer, the term of this patent is extended or adjusted under 35 U.S.C. 154(b) by 56 days.

(21) Appl. No.: 14/285,155

(22) Filed: May 22, 2014

(65) Prior Publication Data

US 2015/0339056 A1 Nov. 26, 2015

(51) Int. Cl.
*G06F 3/06* (2006.01)

(52) U.S. Cl.
CPC .............. *G06F 3/061* (2013.01); *G06F 3/06* (2013.01); *G06F 3/065* (2013.01); *G06F 3/0665* (2013.01); *G06F 3/0674* (2013.01); *G06F 2003/0692* (2013.01)

(58) Field of Classification Search
CPC .............. G06F 2212/2022; G06F 2212/222; G06F 2212/225; G06F 3/0646; G06F 12/12; G06F 12/1483; G06F 11/076; G06F 12/123; G06F 12/127; G06F 17/3048; G06F 17/30917; G06F 2212/465; G06F 9/3834; G06F 17/30067; G06F 2003/0692; G06F 3/06; G06F 3/061; G06F 3/065; G06F 3/0665; G06F 3/0674
See application file for complete search history.

(56) References Cited

U.S. PATENT DOCUMENTS

| 7,526,481 | B1* | 4/2009 | Cusson et al. | .... G06F 17/30902 |
| 8,046,561 | B1* | 10/2011 | Todd | .................. G06F 17/30097 |
| | | | | 711/108 |
| 8,868,831 | B2* | 10/2014 | Goyal | ................. G06F 12/0866 |
| | | | | 707/E17.12 |
| 2007/0050540 | A1* | 3/2007 | Klein | .................. G06F 12/0866 |
| | | | | 711/113 |
| 2008/0071816 | A1* | 3/2008 | Gray | ....................... H04L 67/26 |
| 2014/0351520 | A1* | 11/2014 | Moharil | ............. G06F 12/0871 |
| | | | | 711/122 |

OTHER PUBLICATIONS

Stackowiak, et al., "Improving Oil & Gas Performance with Big Data", Oracle Enterprise Architecture White Paper, Apr. 2015; 24 pages.

* cited by examiner

*Primary Examiner* — Hashem Farrokh
(74) *Attorney, Agent, or Firm* — Cantor Colburn LLP

(57) ABSTRACT

An apparatus for processing data from a host storage device includes a client processing device configured to be connected by a communication channel to the host storage device. The client processing device includes: a processor configured to request a data set stored at the host storage device, the data set associated with a globally unique identifier; and a cache configured to store a copy of the data set and the globally unique identifier based on the processor receiving the data set from the host storage device, the cache being a persistent storage configured to retain the copy of the data set until the processor stores a new data set in the cache, the cache configured to retain the copy of the data set independent of an amount of time that the data set is stored in the cache.

16 Claims, 5 Drawing Sheets

CLIENT-SIDE DATA CACHING

BACKGROUND

Various processing tools are utilized in relation to energy industry operations and are used to perform tasks including data collection, storage, modelling and analysis. Data from various sources (e.g., measurement and analysis data from various well locations and regions) can be aggregated in a repository for access by numerous users. Object-oriented programming is used to manage data sets, and involves the interaction among a plurality of data objects to implement a computer application.

Some data collection systems are configured as a distributed object system, which includes multiple nodes, each of which is capable of storing a variable amount of object data. Distributed objects may be spread over multiple computers in the system or multiple processors within a computer, and different objects may be managed by different users on different systems. Such distributed object systems might include a large number of nodes which are remotely located relative to one another and connected together in opportunistic ways.

Data collection systems, such as energy industry collection systems that utilize data repositories, often employ client-server models in which data repository servers or hosts act as providers of resources or data and client computers act as requesters of server resources or data. The client-server model is a well-established paradigm where the server can be a repository of a potentially huge set of data while more or more clients access this data through some type of network connection. Access to this data can either read, meaning data is moving from server to client, or write, meaning that new or changed data is being moved to the server.

The performance of such client-server systems is heavily dependent on the communication channel between the server or host and the clients. If the communication channel is reliable and fast and the data transfers small, the client-server system will generally perform well, even to the point that the system appears to be a single integrated system. However, the moment that the communications channel becomes compromised (e.g., intermittent or the size of the data transfers become large compared to the throughput capacity of the communication channel), the performance of the client/server system can degrade dramatically to the point where it is unusable.

SUMMARY

An embodiment of an apparatus for processing data from a host storage device includes a client processing device configured to be connected by a communication channel to the host storage device. The client processing device includes: a processor configured to request a data set stored at the host storage device, the data set associated with a globally unique identifier; and a cache configured to store a copy of the data set and the globally unique identifier based on the processor receiving the data set from the host storage device, the cache being a persistent storage configured to retain the copy of the data set until the processor stores a new data set in the cache, the cache configured to retain the copy of the data set independent of an amount of time that the data set is stored in the cache.

An embodiment of a method of processing data from a host storage device includes: retrieving, by a client processing device connected by a communication channel to the host storage device, a data set stored at the host storage device, the data set associated with a globally unique object identifier; storing the data set and the globally unique identifier in a client memory; and storing a copy of the data set and the globally unique identifier in a cache disposed in the client, the cache being a persistent storage that retains the copy of the data set until the processor stores a new data set in the cache, the cache retaining the copy of the data set independent of an amount of time that the data set is stored in the cache.

BRIEF DESCRIPTION OF THE DRAWINGS

Referring now to the drawings wherein like elements are numbered alike in the several Figures.

DETAILED DESCRIPTION

Figure 1:
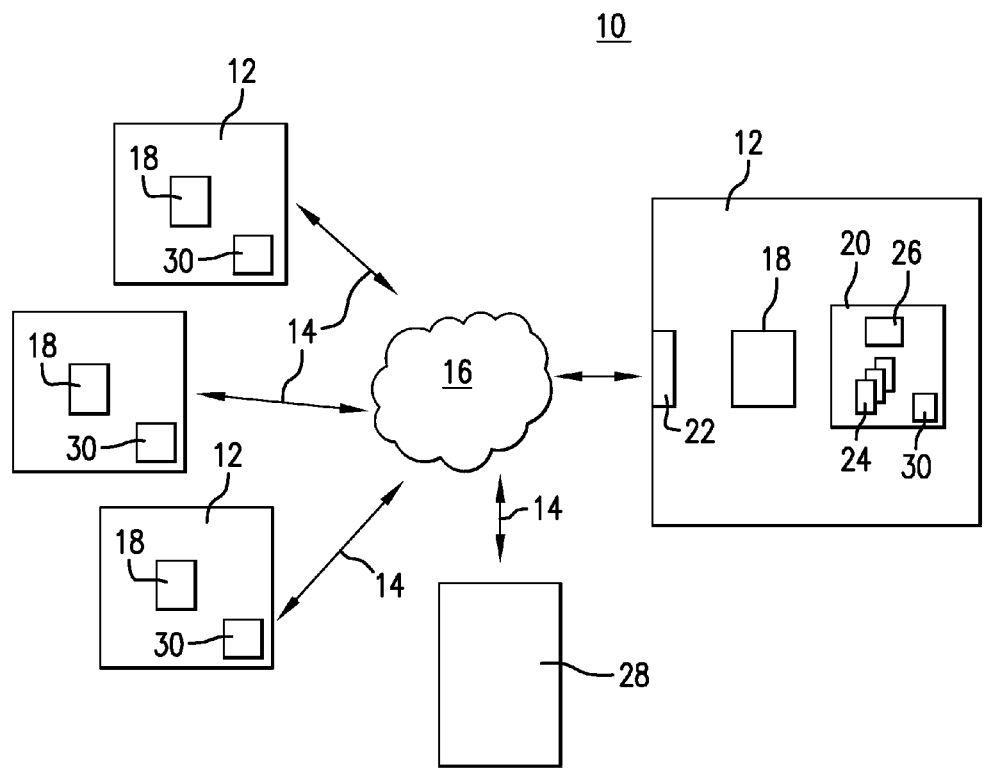
FIG. 1 is a block diagram of an embodiment of a distributed data storage, processing and communication system.

Apparatuses, systems, methods and computer program products are provided for collection, storage and transmission of data. An exemplary apparatus includes a computing device for retrieving, editing and transmitting data stored in a host data storage device or system. In one embodiment, the data is stored and managed as objects by one or more hosts in a distributed network. One or more computing devices are configured as clients to the host and connected to the host via a communication channel. Exemplary data includes oil and gas or energy industry data stored in one or more host data repositories, but is not limited thereto.

Energy industry data includes any data or information collected during performance of an energy industry operation, such as surface or subsurface measurement and modeling, reservoir characterization and modeling, formation evaluation (e.g., pore pressure, lithology, fracture identification, etc.), stimulation (e.g., hydraulic fracturing, acid stimulation), drilling, completion and production.

Each client has the ability to retrieve data objects from the host, create and/or edit data objects via a suitable program, and transmit new or modified data objects to the host for storage. The client also includes a client-side cache for storing data from a data object that is received at the client from the host. The client-side cache is a persistent cache that stores the received data until the data is updated or modified, or new data is received that replaces the stored data. The cache is not subject to an arbitrary or pre-determined timer or time limit.

The client is configured to store a data set from a data object in the client-side cache automatically upon receipt of the data set. Each data object is associated with a globally unique identifier (e.g., an object identifier and a version identifier) that allows both the host and the server to manage and reconcile the states of the objects both client-side and server-side.

The cache holds the stored data set and unique identifier indefinitely, which allows the client to query the host for a data object (e.g., query version information associated with the object identifier), and compare the data object stored in the host with a data object previously stored in the client-side cache. If the objects are exact replicas of each other, the client may retrieve the associated data set directly from the client-side cache, which eliminates the need for redundant transfers of data from the host.

In a client-server system, the client queries the host or server for data and commits changes made on the client to the server. The queries for data and commits of changes perform poorly or fail when the communication channel between client and server is slow, intermittent and unreliable. Embodiments described herein address this problem by temporarily storing queried data and changes so that communication between client and server can occur opportunistically while improving as much as possible the user experience on the client. The client-side cache is an active logic component on the client, always on, which serves to isolate client-side applications from the vagaries of the reliability and performance of the communication channel to the server.

In one embodiment, if the communication channel between the client and the host is poor or lost entirely, the client stores changes to the data set in the client-side cache pending restoration of the communication channel. Upon restoration of the channel, the client automatically transmits the changed data set (e.g., a new version) from the cache to the host. If further changes are made to the data set while communication is poor or lost, the client commits those changes to the client-side cache. If the client is restarted or otherwise needs to retrieve the data set and the communication has not been restored, the client can retrieve the data set from the client-side cache. Thus, interactions with the data set during poor communication take place with the cache as if the cache were the host, allowing a user to continue working with the data set during poor communication periods.

While embodiments are detailed below with specific reference to distributed objects for explanatory purposes, alternate embodiments apply, as well, to other multi-version environments.

FIG. 1 is a block diagram of a distributed data storage, processing and communication system 10. The system 10 includes a plurality of processing devices or nodes 12. The nodes 12 each have computing components and capabilities, are connected by links 14, which may be wired or wireless. One or more of the nodes 12 may be connected via a network 16, such as the internet or an internal network. Each node 12 is capable of independent processing, and includes suitable components such as a processor 18, memory 20 and input/output interface(s) 22. The memory 20 stores data objects 24 or other data structures, and a program or program suite 26. The nodes may be computing devices of varying size and capabilities such as server machines, desktop computers, laptops, tablets and other mobile devices.

An exemplary program is an energy industry data storage, analysis and/or modeling software program. An example is JewelSuite™ analysis and modeling software by Baker Hughes Incorporated.

In one embodiment, the system includes one or more data storage locations. For example, the system 10 includes a node configured as a centralized data repository 28. The repository 28 is accessible by each node 12. In one embodiment, the system 10 includes a Distributed Object Network, where each node 12 can access and be used to edit a distributed object, e.g., an object 24. Thus, users can independently retrieve, copy and edit stored data. This independent editing may result in numerous different versions or copies of an object.

In one embodiment, one or more of the nodes 12 is a host that stores data and communicates with one or more nodes 12 as clients. For example, the repository 28 includes a server that acts as a host computer or host storage device and performs data management and data services functions. An exemplary client/server system or network includes an energy industry data storage and sharing network that is accessible by multiple client devices that can send data to one or more data repositories and retrieve data stored in one or more data repositories. The repositories include servers or other programs for managing the data, and the clients include suitable programs (e.g., a JewelSuite application) that allow users to store, edit and retrieve data. Each client includes, for example, a processor 18 that runs a suitable data processor program 26, such as a log editor. In one embodiment, each client also includes a client-side cache 30 that temporarily stores data received from the repository 28 and may also store data modified by or generated by the client pending transfer to the server. This embodiment allows the client to access requested data and modify the data as required even when communications between the client and the repository or other host/server is compromised or severed.

A distributed object, referred to simply as an object, is a container for state information and also defines methods and properties that act on that state. An object type is a template that can be used to create an unlimited number of objects, which are initially identical, but become different as the object state changes.

In a distributed object system, some objects are transitory, derivative of other objects, or are otherwise of secondary importance to this discussion. Exemplary objects of interest are objects that map to real world objects, both physical and abstract, and together model the domain of interest. These objects are designated as domain objects. Exemplary domain objects in the oil and gas domain include fields, reservoirs, wells, geological grids, faults, horizons, and fluid contacts.

Examples of domain objects are wells and simulation grids. An example of an object that is not a domain object is a 3D view object that controls the view of an object, such as a subterranean reservoir data object. The state of the 3D view is serialized to an object file so that when the object file is reopened, the view of the reservoir is restored to the same viewing angle and zoom level. However the state of the 3D view object does not map to a real world object (either physical or abstract) that is being analyzed, and thus this object is not considered a domain object. An example of an object that is not a domain object because of derivation is a well graphics object. The well graphics object implements rendering of a well domain object on the 3D view. The well graphics object contains no state of its own but accesses the state of the well domain object.

In a distributed object system, metadata provides a concise description of the object that can be distributed broadly while the actual data represents the complete object that is often very large and time consuming to move. The metadata is used to identify and/or provide information regarding an object, such as the object type, version, and parameters that the data in the object represents.

An Object Identifier ("Oid") is the globally unique identifier that is used to set each object or domain object apart. When an object or domain object of a particular type is created, a new Oid is generated for it. The Oid may be any suitable type of identifier. An exemplary identifier is a lightweight identifier such as a universally unique identifier (UUID) as specified in RFC 4122.

A Version Identifier ("Vid") is the globally unique identifier that is used to set each version of an object or domain object apart. When an object or domain object of a particular type is created, a new Vid is generated for it, representing the initial, default state of the domain object. As each new version of the domain object is created as a result of self-consistent changes to the state, a new Vid is generated. An exemplary identifier is a lightweight identifier such as a universally unique identifier (UUID) as specified in RFC 4122.

Figure 2:
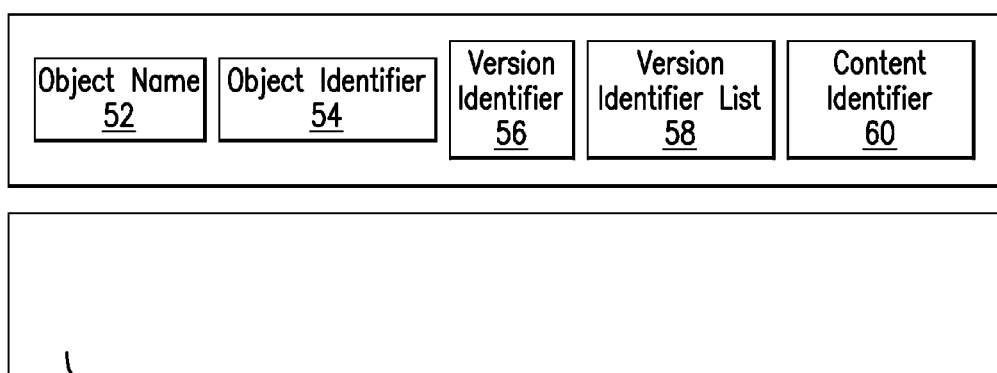
FIG. 2 illustrates exemplary identifiers and metadata associated with a data object stored in the system of FIG. 1.

Exemplary metadata that is associated with or part of an object 50 is shown in FIG. 2. Such metadata is described as associated with a domain object, but may also be associated with any object or other data structure. Each object 50 may be imprecisely identified by a tuple (Name, Version Number), where "Name" is a name given to the object, which may not be unique to the particular domain object 50, and "Version Number" is a number given to the object, which may also not be unique to the domain object 50. Each object 50 may also be precisely identified by a tuple (Oid, Vid), where Oid 54 is an object identifier and Vid 56 is a version identifier. Each of the identifiers (Oid 54 and Vid 56) is universally unique such that, regardless of which user or processing device is editing an object 50, unrelated objects 50 will not have the same Oid 54 and two different edits of the same object 50 will not have the same Vid 56. All objects 50 resulting from the same initial object 50 will have the same Oid 54. However, when one object 50 stems from another, the two objects 50 will have a different Vid 56. Thus, the tuple (Oid, Vid) is unique for each non-identical object 50. The metadata may also include a list of all Vid 56 associated with that object 50, shown in FIG. 2 as a Version identifier List or "VidList" 58. This allows any two object identifiers to be compared to determine the object kinship (e.g., unrelated, identical, ancestor, descendant, or cousin).

As described herein, "metadata" may refer to all data structures associated with an object that are not the actual data (also referred to as a data set) that is stored as the object. For example, metadata may refer to the object name, identifier, version identifier and the version identifier list. In other example, metadata may be described separate from the object identifier, such that a representation of an object can include the object identifier, metadata and/or the actual data.

For each node of the distributed object system, a mechanism is provided to organize the metadata for all objects represented on that node. Examples of this mechanism are described herein.

To effectively manage a large repository of object data, the metadata may be separated from the actual data. As objects become very large and access to the objects is distributed across a large data network, the separate handling of metadata and actual data becomes increasingly important.

In one embodiment, the metadata is loosely coupled to the actual data for an object. "Loose" coupling refers to establishment of a relation between the metadata and the actual data so that metadata can be separately managed and transmitted between nodes while remaining tied to the actual data. This loose coupling is enabled between metadata and actual data and accurately maintained even in the event of changes to either metadata or actual data from multiple sources. The actual data for an object can be stored within the distributed object system and coupled to the metadata such that each can be replicated, synchronized and otherwise moved through the nodes of the distributed object system independent of each other.

In a distributed object system, loose coupling provides the ability for both the metadata and actual data to be replicated across the system according to the various requirements of consumers of system data. The movement and change of objects (including simultaneous changes from different users) can be tracked so as to maximize the storage efficiency and network transfer.

Referring again to FIG. 2, the metadata may include a content identifier 60 that is related to the object identifier 54 and the version identifier 56. The content identifier 60 provides a mechanism to loosely couple the metadata to actual data, allowing the metadata to be distributed separately from the actual data while still tying the metadata to the actual data so that a user can identify the object and all versions of the object. For example, the content identifier 60 is written in a content table or other structure that stores the actual data, and is related to a version table that includes the version identifier 56 and the content identifier 60. Thus, in the system, the object 50 can be represented on each node in one of three ways: as an object identifier, as an object identifier with metadata, or as a complete object including identifier, metadata and actual data.

The Content Identifier ("Cid") is a globally unique identifier that is used to identify actual content of a specific version of an object. This content might be stored in a variety of values. It might be stored as a binary large object (BLOB) in a data base or a file on disk. The content might be stored in a contiguous manner or broken into fragments that are stored separately. The Cid refers to the object actual content as a whole. Moreover the Cid represents a specific and unique location for the object content. If the object content is replicated the new copy of the object content is assigned a new Cid.

Figure 3:
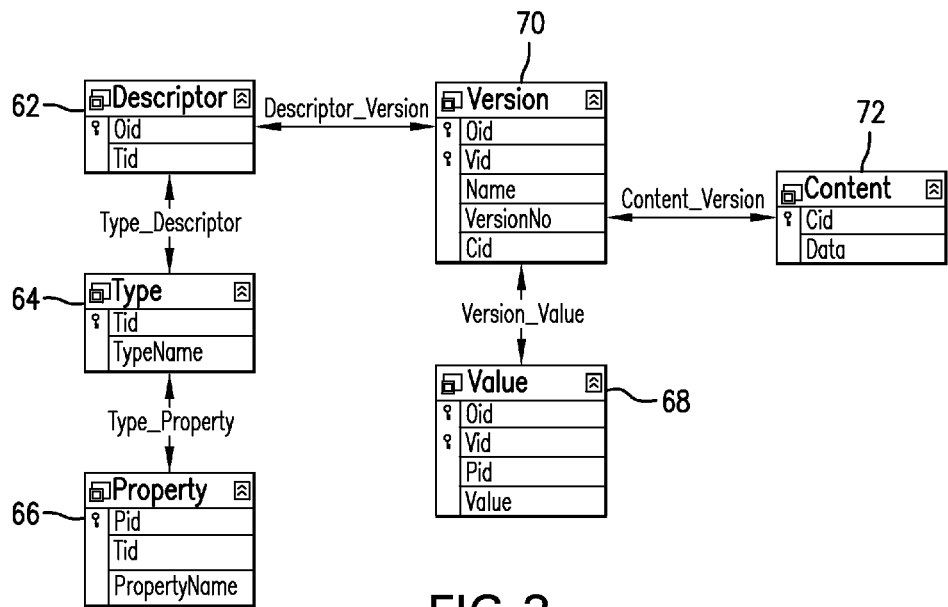
FIG. 3 is a diagram illustrating an embodiment of a data model for storing and organizing identifiers and metadata associated with a data object, and for loosely coupling metadata to actual data of the object.

FIG. 3 shows an example of an organization scheme for metadata that may be applied to oil filed data and other energy industry data. In this example, the data model employs an entity-attribute-value ("EAV") approach, which is extensible in that new or modified domain object definitions can be easily added to an existing repository without redesign or reloading of the data. The organization scheme is not limited to this example. For example, the organization scheme does not need to include an EAV configuration.

Figure 4:
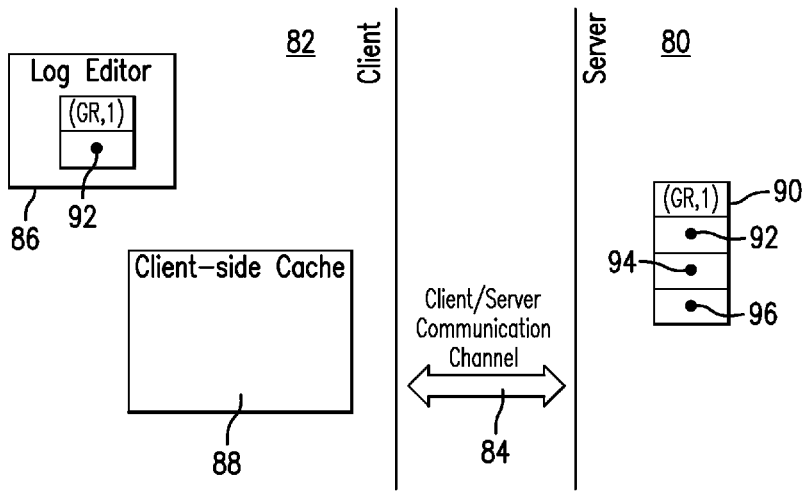
FIG. 4 illustrates an initial state of an exemplary distributed computing system that includes a host computing device configured as a data repository and a client computing device that includes a client-side cache.

Each block in the diagram shown in FIG. 4 represents a relational table, which may be stored in a database or repository and accessible by a node. Each entry in the block represents a column in the table.

A descriptor table 62 (the "entity" of the EAV model) includes an Oid column for storing the unique identifier for an object and a Type identifier ("Tid") column for storing an indication of the object type. A type table 64 includes the Tid and a Type Name column. A Property or parameter table 66 (the "attribute" of the EAV model) includes a Property identifier ("Pid") column, a Tid column and a Property Name column. A Value table 68 includes an Oid column, a Value identifier ("Vid") column for storing the Vid, a Pid column and a Value column for storing the actual property value. A Version table 70 includes Oid, Vid, Name and Version number columns.

The lines between blocks represent one-to-many relations between the rows of one table and the rows of another table. The relations are from parent to child table. A key symbol designates the parent or "one" side of the relation and an infinity symbol designates the child or "many" side of the relation. In other words, a row in the parent table specifies zero or more rows in the child table. As shown, the Descriptor table 62 is a parent of the Version table 70, which is a parent of the Value table 68. The Property table 66 is also a parent of the Value table 68. The Type table 64 is a parent of the Descriptor table 62 and the Property table 66.

The data model represented by diagram 60 includes a Content table 72 having a relation to the Version table 70. The Content table 72 includes a Cid column and a Data column. The Version table 70 also includes a Cid column. There is a one-to-one relation between the Cid that is the primary key of the Content Table 72 and the Cid column in the Version table 70.

The Data column of the content table 72 is the place where the actual data is stored. The object data might be of varying size and might be very large. The data can be stored using any suitable mechanism, such as BLOBs, disk files and other types of storage. The content for the same object might be stored in different forms in different locations or require data compression or encryption. An attribute of the actual data is that there exists a lossless mechanism for transferring the actual content from one node to another.

For the EAV schema, there are four different representations that can be stored in a node or repository at any given time. The first and most fundamental representation is an empty repository in which entries are only located in the Type and Property tables. These tables describe what might be called the shape of objects in the repository. The Type and Property tables can be replicated in a straight-forward manner between all the nodes in a network or system. This does not mean the Type and Property tables are unchanging over the life of the system. Types and associated properties or parameters can be added at any time and then propagate through the system.

The second representation is a repository including the object identifier (Oid) for an object. In this representation, rows in the Descriptor and Version tables are populated in addition to the Type and Parameter tables.

The third representation is an object identifier with metadata. In this representation the Value table is populated as well as the Descriptor, Version, Type and Parameter or Property tables. The fourth representation is a complete representation of the object, with all six tables being populated.

FIGS. 4-9 show an exemplary portion of embodiments of a distributed object system that includes a host computer 80 (also referred to as a host storage device or simply a host) that stores shared data and a client computer or processing device 82 such as a workstation, laptop computer or mobile device (also referred to as a client) that is communicatively connected to the host 80 via a communication channel 84. Typically a data sharing system or network will have multiple clients and may also have multiple hosts. In one embodiment, the system is an energy industry data sharing system. The host 80 is described in examples herein as a server, but is understood to be any type of processor and/or storage device capable of storing, receiving and transmitting data.

The system in these embodiments utilizes client-side caching to facilitate data transfer between the host 80 and the client 82. Each client 82 includes a processor that executes a log editor 86 (or other data retrieval and editing program) stored in a main memory of the client 82 (also referred to as a client memory). Each client also includes a client-side cache 88 that is configured to temporarily store data sets received by the client 82 and may also store client-generated data sets pending transmission to the host 80. The cache 88 may be a block of the main memory storage or a different storage device. Client-generated data sets and objects may include any data set or object that is created by the client, or any data set or object that is received by the client and modified in some way, e.g., by changing data in the data object or adding data to the data object. The cache 88 is a persistent cache that is configured to hold data objects stored therein by the client until the client overwrites a data object or transmits the data object to the host 80. There is no set time limit associated with the cache 88. Data objects can be stored indefinitely until the client processor removes the data object, e.g., by transmitting the data object or storing a new version of the data object. The cache can be embodied in any type of storage device, such as a hard drive or flash memory.

FIG. 4 shows an exemplary configuration in which the client 82 and the host 80 are in an initial state. In the following examples, the host is a server (or multiple servers) configured as a data repository, such as an EAV repository to which energy industry data from various sources is stored. In the following examples, the identifiers, metadata and data sets (i.e., actual data) are stored in the repository as data objects, and the identifiers and metadata are loosely coupled to the actual data and organized according to an EAV scheme as described above. However, the loose coupling embodiments may be used with any suitable metadata organization schema, and is not limited to use with the specific types of metadata described herein.

The server stores a data object such as a well log object 90 denoted by the term (GR, 1), where "GR" is the object name, and "1" is the object version number. The well log object 90 may be represented in different forms. In the server, the object 90 is fully represented, and includes a unique object identifier 92, metadata 94 and the actual data 96 for which the object 90 was created. The server is shown as storing a single object for purposes of illustration, but will typically store many data objects representing data from various sources. The number and type of data objects, and the number and type of nodes, are not limited to the examples and embodiments described herein.

In the initial state, the host 80 has the EAV repository, which in this example includes a single complete well log object 90 (the GR object), which includes the identifier 92 (e.g., Oid and Vid), metadata 94 (e.g., EAV, Cid) and the actual data. The client 82 at this point does not have metadata or actual data, but only has the object identifier 92. At this initial state, prior to retrieving log data from the server, the client stores an empty client-side cache 88. The log editor had previously obtained the GR well log identity (a copy of the identifier 92) by browsing the server repository or via some other mechanism.

Figure 5:
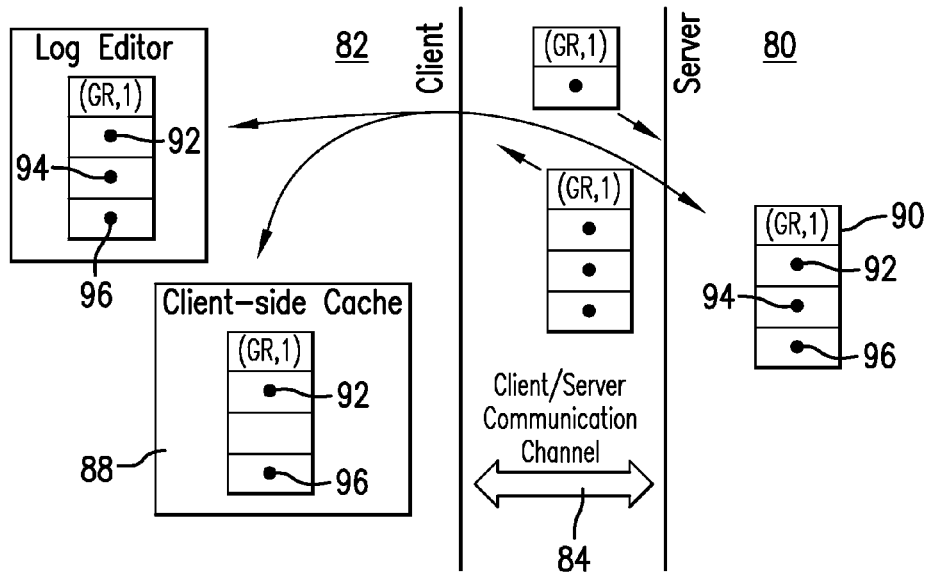
FIG. 5 illustrates retrieval and storage of a first version of a data object from a host computing device in a client computing device and a client-side cache.

Referring to FIG. 5, the log editor 86 retrieves the actual well log data by opening the well log for editing. The log editor 86 queries the host 80 using the identifier 92 which causes the host 80 to transfer the full object 90, including metadata 94 and actual data 96, to the client 82. The client 82 receives and stores the object 90 in memory, and also stores a copy of the actual data 96 in the client-side cache 88. In the example shown in FIG. 6, the cache 88 stores both the object identifier 92 and the actual data 96.

Figure 6:
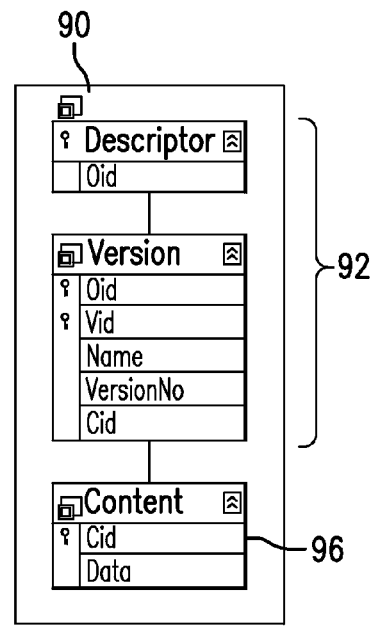
FIG. 6 illustrates a data model for storing and organizing identifiers and actual data from a data object in the client-side cache of FIG. 5.

The client-side cache 88 is configured as a simpler implementation of the repository held by the server. For example, when the client 82 retrieves a data object, the client 82 stores the identifier 92 (Oid, Vid) in client-side Descriptor and Version tables, stores the metadata 94 in client-side tables, and stores the actual data in a client-side Content table. The cache 88 only receives the identifier 92, which includes an Oid and a Vid, and the actual data 96. For example, as shown in FIG. 6, the cache 88 only stores cache Descriptor, Version and Content Tables. In other words, the cache 88 contains the object identity and actual data, but no metadata.

In one embodiment, the log editor 86 retrieves a data set (e.g., the GR well log) by querying the version table entries for the data set represented by the Oid in the host 80. In the example of FIG. 5, the version table entries indicate the data object 90 (GR, 1) includes the latest version of the well log. If the log editor 86 is stopped or restarted, or is otherwise returned to the initial state but has the well log data stored in the cache 88, the log editor 86 queries the version table entries in the host 80. If the version stored in the host 80 is the same as that stored in the cache 88, the log editor 86 reads the actual data from the cache 88, which relieves that host 80 of having to re-send the actual data. Since the cache 88, in one embodiment, does not contain metadata, the metadata is created from the actual data. That is, the actual data must be a proper superset of the metadata.

Figure 7:
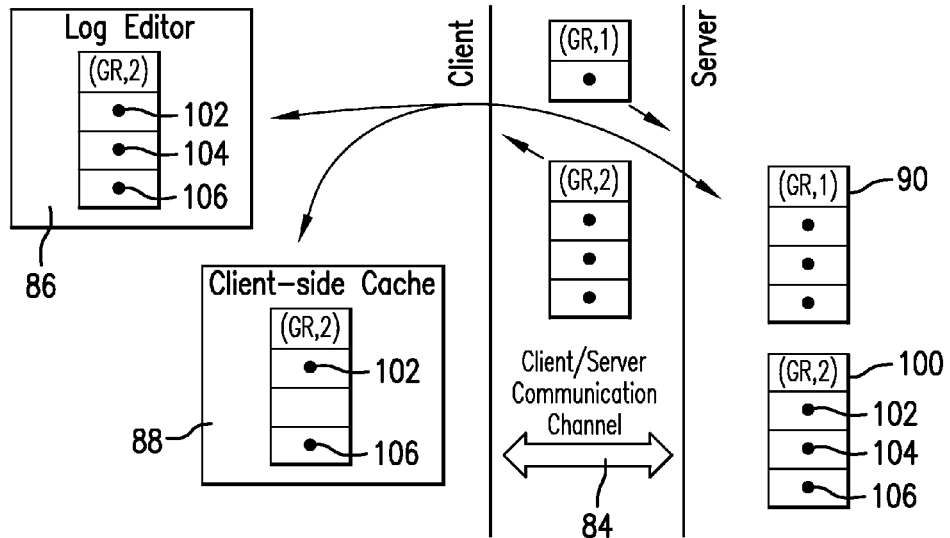
FIG. 7 illustrates retrieval and storage of a second version of the data object of FIG. 5.

In the case where the actual data has changed on the host 80, the version table query results in the discovery of a later version of the actual data, and this later version is returned to the client 82 and is placed in the cache 88. For example, as shown in FIG. 7, the host 80 includes a second version of the well log, denoted as (GR, 2) and represented by a data object 100, which includes an identifier 102 (which includes the same Oid as the first version but a new Vid), metadata 104 and the new version 106 of the actual data.

There are no timers involved in this mechanism. It does not matter how often the Log Editor requests actual data or how long between requests, only one actual transfer of actual data for each version of the well log is made. In contrast, traditional caching approaches would transfer actual data each time the cache timer expired.

Figure 8:
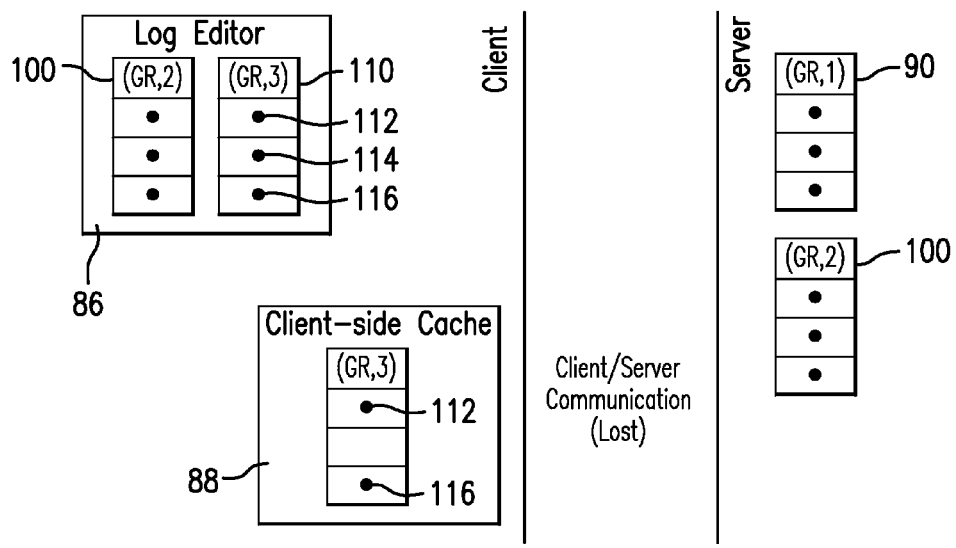
FIG. 8 illustrates the use of the client-side cache of FIG. 5 in an instance where communication between the host computing device and the client computing device is lost.
Figure 9:
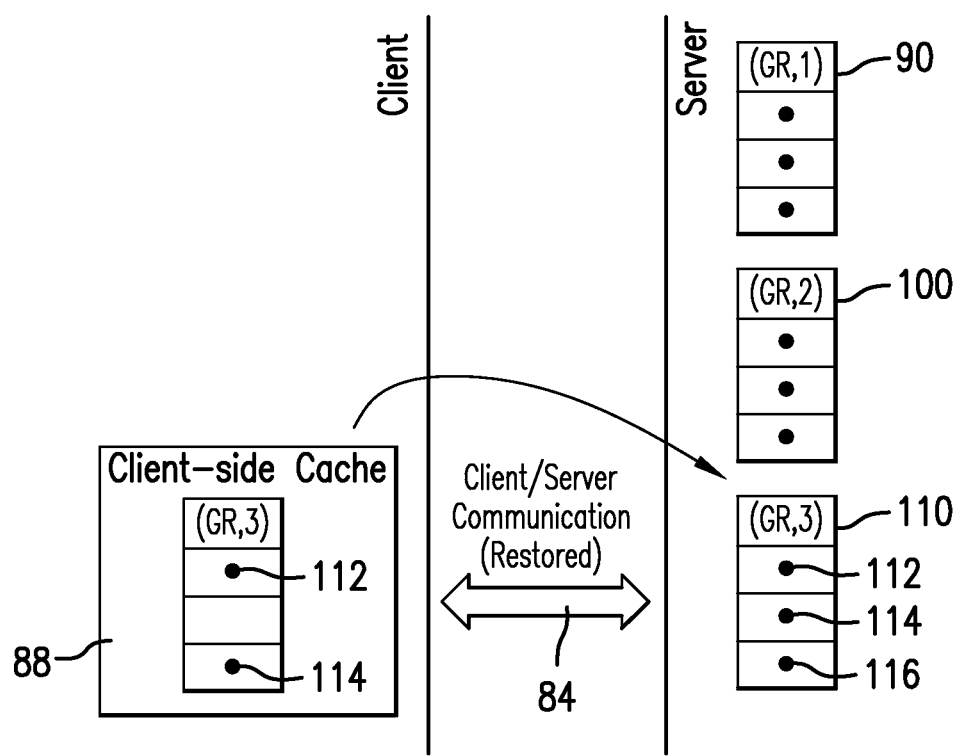
FIG. 9 illustrates the use of the client-side cache of FIG. 5 in an instance where communication between the host computing device and the client computing device is restored after a loss of communication.

FIGS. 8 and 9 illustrate an exemplary use of the client-side cache 88 in instances where the communication link 84 between the client 82 and the host 80 or server is lost or compromised in some way. In the event that communication to the host 80 is lost, and the log editor 86 wants to open the well log (or other data set), the log editor 86 can simply open the actual data from the cache 88 if the actual data was previously retrieved prior to the loss of communication. In this instance, there is no query of the version table on the host 80 and thus there is some danger of using obsolete data from the cache. However, in most situations, this is preferable to not being able to use the log editor at all.

If the well log is modified or a well log is created, the log editor 86 may place the well log in the cache 88. For example, as shown in FIG. 8, the log editor 86 modifies the GR well log and thus creates a third version of the well log (GR, 3) represented by the data object 110. The data object 110 includes an object identifier 112, metadata 114 and the third version 116 of the actual data. The log editor 86 then sends the object 110 to the server and also stores the third version 116 in the cache 88.

In the event that communication with the server is lost and the object 110 has not been sent to the host 80, as shown in FIG. 8, the third version 116 sits in the cache 88 until communication is restored. If desired, the log editor 86 can continue operation and query the data stored in the cache as if it was stored on the server. Once communication is restored as shown in FIG. 9, the third version 116 is sent to the host 80, which can recreate the metadata 114 to generate the full representation of the well log.

As indicated above, the embodiments described herein are not limited to any specific metadata, identifier or loose coupling configuration. For example, globally unique identifiers can take any suitable form that can be related or otherwise connected to the actual data while being able to be transmitted separately from the actual data. Likewise, the metadata described herein is not limited to a specific configuration such as an EAV configuration.

Embodiments described herein have numerous advantages. The client-side caching of actual data described here allows client-side applications to consume and modify server data in situations where traditional approaches would either fail completely or become highly inefficient. The embodiments described herein are very robust in the case where communication between client and server is intermittent, unreliable or is otherwise less than ideal.

To mitigate the performance degradation when data is large or communication is slow, prior art client/server systems employ a caching strategy in which data that is transferred from server to client is placed in a local cache. There are two significant problems with this type of caching strategy. The first is that there is no way reliable way to determine if the data which is cached has changed on the server. By using the cached data, the client risks unknowingly using obsolete data. The way traditional caching system address this problem is to limit the time that the data can be cached to a certain user configured value, for example 60 seconds. If the queried data has resided in the cache for more than this time, then the data is resent from the server. This is highly inefficient since in most cases the server data has not changed and the data in the cache would be perfectly suitable for use.

The second problem is that this type of caching strategy does not support changes to the data. If the client elects to change the data, the data must be immediately sent to the server. In most cases this is what is desired anyway since other clients of the server will need access to the modified data. However, in the case of an unreliable communication channel, work on the client must stop completely until the modified data is transferred to the server. This is burdensome on the client since the client should be able to continue modifying data and accessing the modified data from the cache even in the situation where communication is lost completely.

Embodiments described herein address such problems by providing a persistent cache that is not subject to a timer or time limit, and can be employed to continue working with data from a host even in instances where communication is compromised and/or lost. In addition, embodiments described herein eliminate unnecessary data transfers and thus reduce operating burdens on communication channels, since regardless of how often a client requests actual data or the time between requests, only one actual transfer of actual data for each version of a data set is made. In contrast, traditional caching approaches would transfer actual data each time the cache timer expired.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for processing data from a host storage device, comprising:
   a client processing device configured to be connected by a communication channel to the host storage device, the client processing device including:
   a processor configured to request a data set stored in an object at the host storage device, the data set associated with a globally unique identifier including a version identifier, the object including metadata that provides a description of the object; and
   a cache configured to store a copy of the data set and the globally unique identifier based on the processor receiving the data set from the host storage device, the cache being a persistent storage configured to retain the copy of the data set until the processor stores a new data set in the cache, the cache configured to retain the copy of the data set independent of an amount of time that the data set is stored in the cache, wherein the processor is configured to receive the object in response to the request, store the globally unique identifier, the metadata and the data set in a client memory, and store only the copy of the data set and the globally unique identifier in the cache, and wherein the processor is configured to, in response to a new version of the data set being created, at least one of modify and replace the copy of the data set.

2. The apparatus of claim 1, wherein the globally unique identifier includes an object identifier and the version identifier.

3. The apparatus of claim 2, wherein the processor is configured to request the data set by:
   querying the host storage device to determine a latest version of the data set and checking the cache to determine whether the cache is storing data; and
   based on the object identifier and the version identifier of the latest version being identical to object and version identifiers stored in the cache, retrieving the latest version of the data set from the cache.

4. The apparatus of claim 1, wherein the globally unique identifier, the metadata and the data set each have a relation to one another so that the globally unique identifier, the metadata and the actual data can be separately stored and transmitted between the host computing device and the client computing device.

5. The apparatus of claim 4, wherein the globally unique identifier includes a descriptor table holding an object identifier and a version table holding the version identifier, the version table having a relation to the descriptor table, the metadata includes one or more tables holding information describing the data set, the one or more tables having a relation to at least one of the descriptor table and the version table, and the data set is stored in a content table having a relation to the version table.

6. The apparatus of claim 5, wherein the processor is configured to receive the object in response to the request, store the object identifier in a client-side descriptor table, store the version identifier in a client-side version table, and store the data set in a client-side content table.

7. The apparatus of claim 6, wherein the processor is configured to store a copy of the object identifier in a cache descriptor table, store a copy of the version identifier in a cache version table, and store the copy of the data set in a cache content table.

8. The apparatus of claim 1, wherein the processor is configured to, based on the new version of the data set being generated and stored in a client memory by the client processing device, automatically transmit the new version to the host storage device.

9. The apparatus of claim 8, wherein the processor is configured to, based on the communication channel being compromised, store the new version of the data set in the cache.

10. The apparatus of claim 9, wherein the processor is configured to automatically transmit the new version of the data set from the cache to the host storage device based on the communication channel being restored.

11. The apparatus of claim 1, wherein the host storage device includes a data repository for energy industry data.

12. A method of processing data from a host storage device, the method comprising:
   retrieving, by a client processing device connected by a communication channel to the host storage device, a data set stored as an object at the host storage device, the data set associated with a globally unique object identifier including a version identifier, the object including metadata that provides a description of the object, wherein retrieving includes requesting the data set the host storage device and receiving the object, and;

storing the data set, the metadata and the globally unique identifier in a client memory; and storing copies of only the data set the and the globally unique identifier in a cache disposed in the client, the cache being a persistent storage that retains the copy of the data set until the processor stores a new data set in the cache, the cache retaining the copy of the data set independent of an amount of time that the data set is stored in the cache; and at least one of modifying and replacing the copy of the data set in response to a new version of the data set being created.

13. The method of claim 12, wherein the globally unique identifier includes an object identifier and the version identifier, and retrieving includes:

querying the host storage device to determine a latest version of the data set and checking the cache to determine whether the cache is storing data; and based on the object identifier and the version identifier of the latest version being identical to object and version identifiers stored in the cache, retrieving the latest version of the data set from the cache.

14. The method of claim 12, further comprising, based on a new version of the data set being generated and stored in the client memory by the client processing device, automatically transmitting the new version to the host storage device.

15. The method of claim 14, further comprising, based on the communication channel being compromised, storing the new version of the data set in the cache.

16. The method claim 15, further comprising automatically transmitting the new version of the data set from the cache to the host storage device based on the communication channel being restored.

* * * * *